US012763100B2

(12) United States Patent
Nomura et al.

(10) Patent No.: US 12,763,100 B2
(45) Date of Patent: Oct. 13, 2026

(54) MAGNETIC DISK DEVICE AND SIGNAL SYNCHRONIZATION METHOD

(71) Applicants: KABUSHIKI KAISHA TOSHIBA, Kawasaki (JP); TOSHIBA ELECTRONIC DEVICES & STORAGE CORPORATION, Kawasaki (JP)

(72) Inventors: Kazumasa Nomura, Hino Tokyo (JP); Kazuya Takada, Chigasaki Kanagawa (JP)

(73) Assignee: KABUSHIKI KAISHA TOSHIBA; TOSHIBA ELECTRONIC DEVICES & STORAGE CORPORATION, Kawasaki (JP)

( * ) Notice: Subject to any disclaimer, the term of this patent is extended or adjusted under 35 U.S.C. 154(b) by 0 days.

(21) Appl. No.: 19/354,363

(22) Filed: Oct. 9, 2025

(65) Prior Publication Data

US 2026/0279394 A1 Sep. 17, 2026

(30) Foreign Application Priority Data

Mar. 17, 2025 (JP) ................................. 2025-042471

(51) Int. Cl.
*G11B 5/55* (2006.01)
*G11B 5/48* (2006.01)

(52) U.S. Cl.
CPC .......... *G11B 5/5526* (2013.01); *G11B 5/4813* (2013.01); *G11B 5/4846* (2013.01); *G11B 5/486* (2013.01); *G11B 5/5552* (2013.01); *G11B 5/556* (2013.01); *G11B 5/5578* (2013.01)

(58) Field of Classification Search
None
See application file for complete search history.

(56) References Cited

U.S. PATENT DOCUMENTS

| | | | | | |
|---|---|---|---|---|---|
| 5,223,993 | A * | 6/1993 | Squires | G11B 5/5578 360/99.18 |
| 6,646,825 | B1 * | 11/2003 | Kaneda | G11B 5/5552 |
| 7,340,630 | B2 | 3/2008 | Morris et al. | |
| 9,792,938 | B1 * | 10/2017 | Kobayashi | G11B 5/5578 |
| 9,934,803 | B1 * | 4/2018 | Semba | G11B 5/59694 |
| 10,424,328 | B1 * | 9/2019 | Gaertner | G11B 5/4886 |
| 10,482,911 | B1 * | 11/2019 | Nanjunda Swamy | G06F 11/2087 |
| 10,714,133 | B1 * | 7/2020 | Johnson | G11B 5/59688 |
| 11,222,658 | B1 * | 1/2022 | Wernow | G11B 5/4833 |

(Continued)

*Primary Examiner* — Peter Vincent Agustin
(74) *Attorney, Agent, or Firm* — Knobbe, Martens, Olson & Bear, LLP

(57) ABSTRACT

A magnetic disk device according an embodiment includes a magnetic disk, first/second magnetic heads, first/second actuator systems moving the first/second magnetic heads over the magnetic disk, and first/second controller chips controlling the first/second magnetic heads and the first/second actuator systems. The first controller chip generates a reference signal of operation. The reference signal is detected and counted by the first controller chip and the second controller chip. The first controller chip transmits the reference signal to the second controller chip. The second controller chip receives the reference signal and regenerates the reference signal. The second controller chip performs synchronization with the first controller chip based on the reference signal regenerated.

12 Claims, 11 Drawing Sheets

(56) References Cited

U.S. PATENT DOCUMENTS

| | | | | |
|---|---|---|---|---|
| 11,557,313 | B2 | 1/2023 | Sudo | |
| 2001/0015866 | A1 * | 8/2001 | Nakagawa ........... | G11B 5/5552<br>360/78.12 |
| 2007/0165333 | A1 * | 7/2007 | Kwon .................. | G11B 5/4873 |
| 2017/0169844 | A1 * | 6/2017 | Kawabe ............... | G11B 5/5552 |
| 2020/0302960 | A1 * | 9/2020 | Tokuda ................ | G11B 25/043 |
| 2022/0157338 | A1 * | 5/2022 | Tzou .................... | G11B 5/5552 |
| 2022/0262394 | A1 * | 8/2022 | Okamoto ............. | G11B 5/4833 |

* cited by examiner

MAGNETIC DISK DEVICE AND SIGNAL SYNCHRONIZATION METHOD

CROSS-REFERENCE TO RELATED APPLICATIONS

This application is based upon and claims the benefit of priority from Japanese Patent Application No. 2025-042471, filed on Mar. 17, 2025; the entire contents of which are incorporated herein by reference.

FIELD

Embodiments described herein relate generally to a magnetic disk device and a signal synchronization method.

BACKGROUND

A magnetic disk device that is equipped with a split actuator has been known. The split actuator is constituted by a plurality of actuator systems. The split actuator moves each of magnetic heads independently to perform reading of data and writing of data.

In order to control the actuator systems, the magnetic disk device, in which controller chips are connected by data communication circuitry, is required to operate the controller chips while synchronizing operation of these controller chips.

In the magnetic disk device including such a split actuator, a CPU timer is provided, which is unique to each controller chip, to manage commands and time stamps.

The above-described magnetic device is required to prevent deviation of values of the CPU timers between the controller chips.

Therefore, there is a need to implement correct synchronization between the controller chips while preventing deviation of timer value between those controller chips even after the lapse of time.

DETAILED DESCRIPTION

According to an embodiment, a magnetic disk device includes one or more magnetic disks on each of which tracks are provided. Each of the tracks includes data sectors. The magnetic disk device includes one or more first magnetic heads and one or more second magnetic heads, each configured to write data and read data to and from data sectors of the one or more magnetic disks. The magnetic disk device includes a first actuator system, a second actuator system, a first controller chip, and a second controller chip. The first actuator system is configured to move the one or more first magnetic heads. The second actuator system is configured to move the one or more second magnetic heads. The first controller chip is configured to control the one or more first magnetic heads and the first actuator system. The second controller chip is configured to control the one or more second magnetic heads and the second actuator system. The first controller chip is configured to generate a reference signal of operation. The reference signal is detected and counted by the first controller chip and the second controller chip. The first controller chip is configured to transmit the reference signal to the second controller chip. The second controller chip is configured to receive the reference signal and regenerate the reference signal. The second controller chip is configured to perform synchronization with the first controller chip based on the reference signal regenerated.

Hereinafter, the magnetic disk device according to an embodiment will be described in detail with reference to the attached drawings. Note that the present invention is not limited by these embodiments.

EMBODIMENTS

Figure 1:
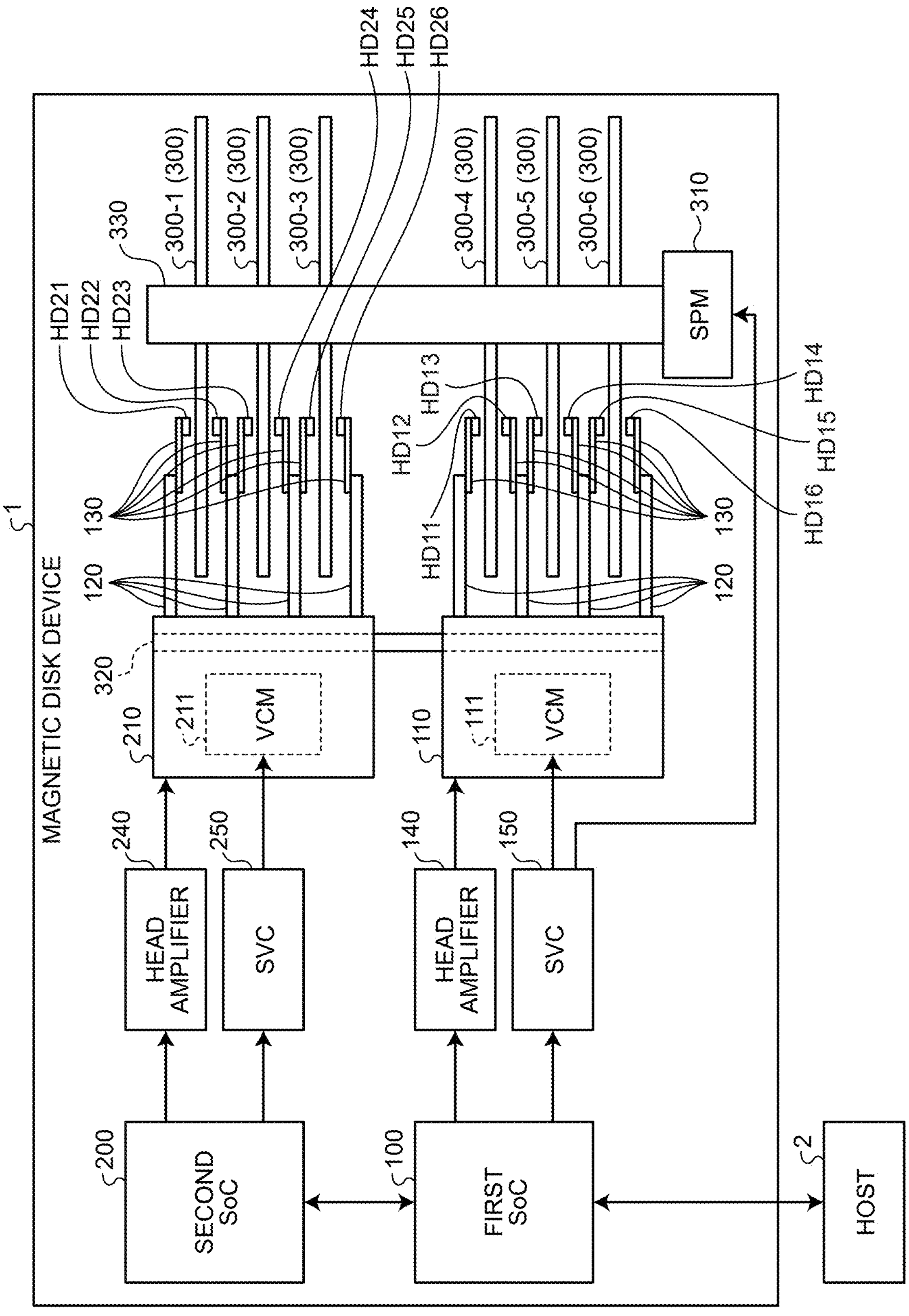
FIG. 1 is a diagram illustrating an example of a configuration of a magnetic disk device according to an embodiment.

FIG. 1 is a diagram illustrating an example of a configuration of a magnetic disk device according to the embodiment. A magnetic disk device 1 can be connected to a host 2. The standard of the communication path between the magnetic disk device 1 and the host 2 is not limited to a specific standard. In one example, Serial Attached SCSI (SAS) can be adopted.

Examples of the host 2 include a processor, a personal computer, or a server. The magnetic disk device 1 can receive an access command (a read command and a write command) from the host 2.

The magnetic disk device 1 includes a magnetic disk 300 that rotates about a rotation shaft 330 of a spindle motor (SPM) 310. The magnetic disk device 1 according to the present embodiment includes six magnetic disks 300-1, 300-2, 300-3, 300-4, 300-5, and 300-6. The six magnetic disks 300-1, 300-2, 300-3, 300-4, 300-5, and 300-6 are integrally rotated by the SPM 310.

The six magnetic disks 300 each have recording surfaces on the front and back faces thereof, which are capable of recording data. In order to access each of the total of twelve recording surfaces of the six magnetic disks 300, the magnetic disk device 1 includes twelve magnetic heads HD11 to HD16 and HD21 to HD26.

The magnetic head HD11 is provided so as to face the front surface of the magnetic disk 300-4. The magnetic head HD12 is provided so as to face the back surface of the magnetic disk 300-4. The magnetic head HD13 is provided so as to face the front surface of the magnetic disk 300-5. The magnetic head HD14 is provided so as to face the back surface of the magnetic disk 300-5. The magnetic head HD15 is provided so as to face the front surface of the magnetic disk 300-6. The magnetic head HD16 is provided so as to face the back surface of the magnetic disk 300-6. The magnetic head HD21 is provided so as to face the front surface of the magnetic disk 300-1. The magnetic head HD22 is provided so as to face the back surface of the magnetic disk 300-1. The magnetic head HD23 is provided so as to face the front surface of the magnetic disk 300-2. The magnetic head HD24 is provided so as to face the back surface of the magnetic disk 300-2. The magnetic head HD25 is provided so as to face the front surface of the magnetic disk 300-3. The magnetic head HD26 is provided so as to face the back surface of the magnetic disk 300-3.

Hereinafter, in some cases, the twelve magnetic heads HD11 to HD16 and HD21 to HD26 will be collectively referred to as a magnetic head HD. Each magnetic head HD can execute access, namely, data recording and data reproduction with respect to a recording surface of the corresponding magnetic disk 300 facing the corresponding magnetic head HD.

The magnetic disk device 1 includes two actuator systems 110 and 210 that can be driven independently of each other.

The first actuator system 110 includes a voice coil motor (VCM) 111, four actuator arms 120, and six suspensions 130. Each of the six suspensions 130 included in the first actuator system 110 supports any one of the magnetic heads HD11 to HD16. Each of the six suspensions 130 included in the first actuator system 110 is attached to a distal end of any one of the four actuator arms 120.

The second actuator system 210 includes a voice coil motor (VCM) 211, four actuator arms 120, and six suspensions 130. Each of the six suspensions 130 included in the second actuator system 210 supports any one of the magnetic heads HD21 to HD26. Each of the six suspensions 130 included in the second actuator system 210 is attached to a distal end of any one of the four actuator arms 120.

Figure 2:
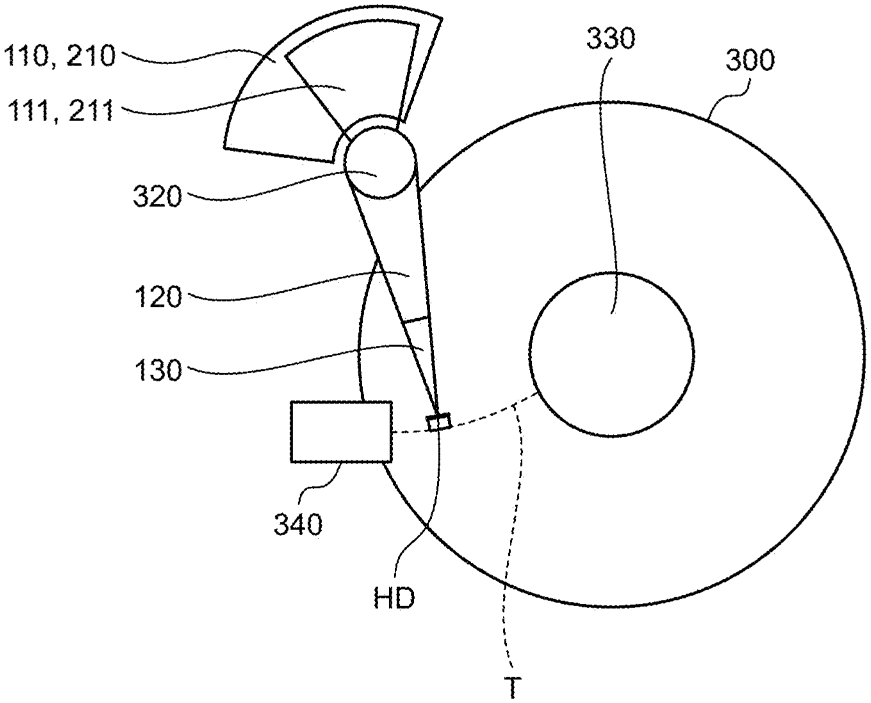
FIG. 2 is a diagram illustrating an example of a positional relationship between an actuator system and a magnetic disk according to the embodiment.

FIG. 2 is a diagram illustrating an example of a positional relationship between the actuator system and the magnetic disk according to the embodiment. The two actuator systems 110 and 210 can rotate about a rotation shaft 320. The rotation shaft 320 is disposed at a position that is parallel to the rotation shaft 330 and separated from the rotation shaft 330. The VCM 111 can rotate the first actuator system 110 within a predetermined range around the rotation shaft 320. The VCM 211 can rotate the second actuator system 210 within a predetermined range around the rotation shaft 320. Accordingly, the first actuator system 110 can move the magnetic heads HD11 to HD16 relative to the recording surfaces of the magnetic disks 300-4 to 300-6 in the radial direction. The second actuator system 210 can move the magnetic heads HD21 to HD26 relative to the recording surfaces of the magnetic disks 300-1 to 300-3 in the radial direction.

As illustrated in FIG. 2, the actuator systems 110 and 210 can move the magnetic head HD along a trajectory T, relative to the recording surface of the magnetic disk 300. The magnetic disk device 1 is provided with a ramp load mechanism 340 that parks each magnetic head HD on the trajectory T near an outer end of the magnetic disk 300.

Concentric tracks are provided in the radial direction on the magnetic disk 300. In data regions provided along the track, data sectors for data writing are arranged.

The magnetic head HD reads data and writes data from and in the data sector of the magnetic disk 300 by using a write element and a read element of the magnetic head HD.

Returning to the description with FIG. 1, the magnetic disk device 1 further includes a first system-on-a-chip (SoC) 100, a second SoC 200, head amplifiers 140 and 240, and servo controllers (SVC) 150 and 250.

The head amplifier 140 can amplify signals read from the magnetic disk 300 by the magnetic heads HD11 to HD16 and supply the amplified signals to the first SoC 100. In the first SoC 100, the signals supplied from the head amplifier 140 are demodulated into digital data by a read channel circuit (not illustrated).

In addition, signals corresponding to digital data are supplied from the first SoC 100 to the head amplifier 140. The head amplifier 140 can amplify the signals supplied from the first SoC 100 and supply the amplified signals to the magnetic heads HD11 to HD16. Upon receiving the signals, the magnetic heads HD11 to HD16 record the signals on the recording surface of the magnetic disk 300.

Signals corresponding to digital data are supplied from the second SoC 200 to the head amplifier 240. The head amplifier 240 can amplify the signals supplied from the second SoC 200 and supply the amplified signals to the magnetic heads HD21 to HD26. Upon receiving the signals, the magnetic heads HD21 to HD26 record the signals on the recording surface of the magnetic disk 300.

The SVC 150 drives the first actuator system 110 based on an instruction from the first SoC 100. Specifically, the SVC 150 drives the first actuator system 110 to position the magnetic head HD to be used among the magnetic heads HD11 to HD16 at a position instructed by the first SoC 100.

In addition, the SVC 150 drives the SPM 310 based on an instruction from the first SoC 100. The SVC 150 drives the SPM 310 such that the rotation speed of the SPM 310 becomes constant at a predetermined target speed.

The SVC 250 drives the second actuator system 210 based on an instruction from the second SoC 200. Specifically, the SVC 250 drives the second actuator system 210 to position the magnetic head HD to be used among the magnetic heads HD21 to HD26 at a position instructed by the second SoC 200.

The first SoC 100 is connected to the host 2. The first SoC 100 interprets an access command from the host 2. Then, the first SoC 100 controls the head amplifier 140 or the SVC 150, or both of these while communicating with the second SoC 200. The first SoC 100 further controls the magnetic heads HD11 to HD16 and the first actuator system 110.

The second SoC 200 interprets an access command from the host 2 and controls the head amplifier 240 or the SVC 250, or both of these while communicating with the first SoC 100. The second SoC 200 further controls the magnetic heads HD21 to HD26 and the second actuator system 210.

The first SoC 100 is an example of the first controller chip. The second SoC 200 is an example of the second controller chip.

Figure 3:
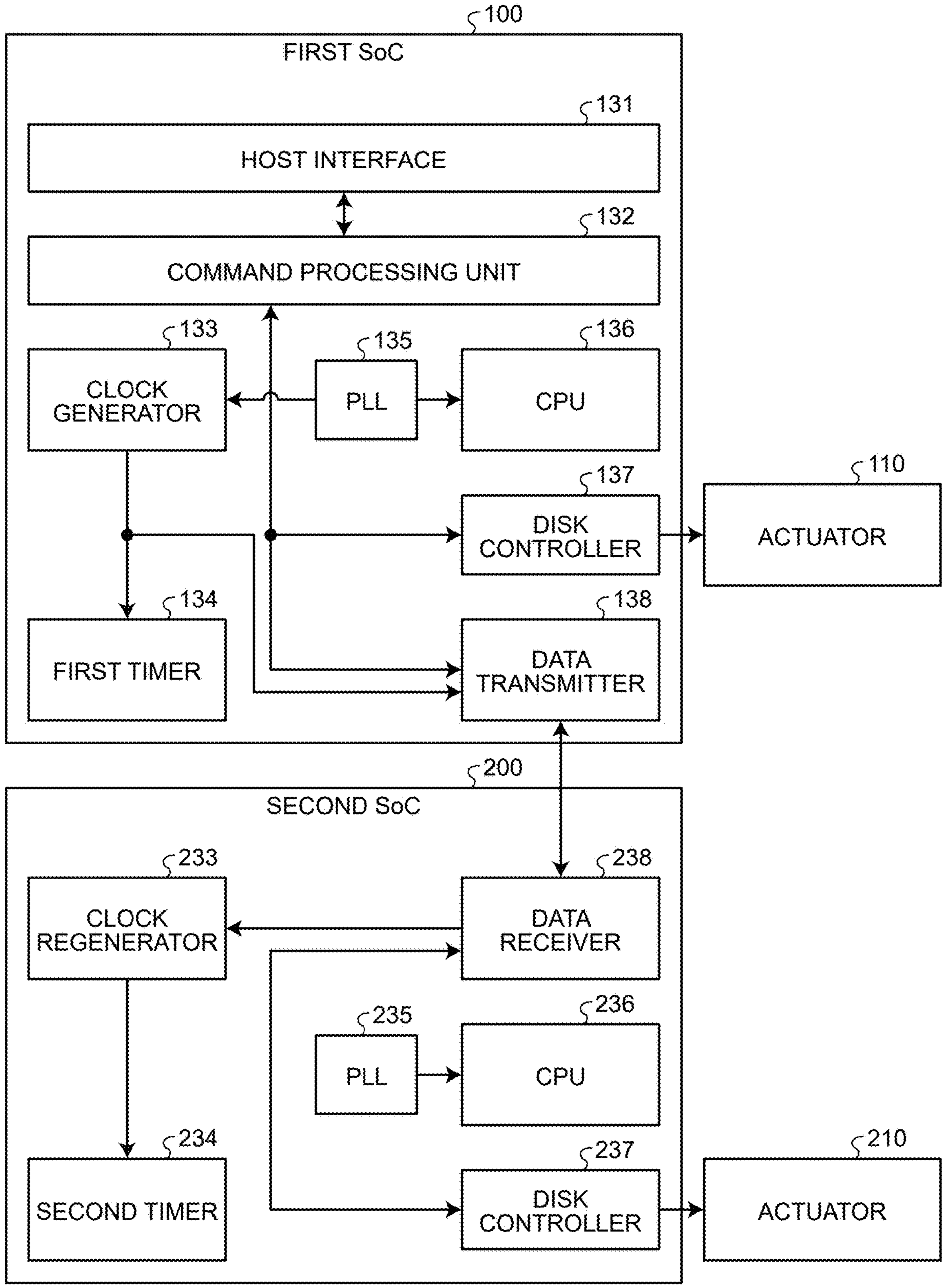
FIG. 3 is a block diagram illustrating an example of a system configuration of a first SoC and a second SoC according to the present embodiment.

Hereinafter, a system configuration in the first SoC 100 and the second SoC 200 will be described. FIG. 3 is a block diagram illustrating an example of a system configuration of the first SoC 100 and the second SoC 200 according to the present embodiment.

The first SoC 100 includes a host interface 131, a command processing unit 132, a clock generator 133, a first timer 134, a Phase Locked Loop (PLL) 135, a CPU 136, a disk controller 137, and a data transmitter 138.

The host interface 131 is an interface for receiving an access command from the host 2.

The command processing unit 132 processes the access command from the host 2 and gives a control signal to the disk controller 137 and the data transmitter 138.

The CPU 136 operates in accordance with a firmware program. The firmware program is stored in a predetermined non-volatile storage region. The predetermined non-volatile storage region may be the magnetic disk 300 or Read Only Memory (ROM) (not illustrated).

In order to manage commands and time stamps, the PLL 135 generates a signal with a stable frequency. The PLL 135 gives this signal to the clock generator 133 and the CPU 136.

The clock generator 133 generates a clock signal for a timer. Specifically, a signal to which the reference clock is added is generated based on the above-mentioned signal from the PLL 135. This signal is given to the first timer 134 and the data transmitter 138. The clock signal generated as described above is used as a reference signal of operation between the first SoC 100 and the second SoC 200.

The first timer 134 receives the clock signal generated by the clock generator 133, and counts a timer value every time the reference clock is detected.

The data transmitter 138 receives data of the clock signal from the clock generator 133 and transmits data packets including the reference clock to the second SoC 200.

While communicating with the command processing unit 132 and the data transmitter 138, the disk controller 137 adjusts the operation timing relative to the second SoC 200 and issues an instruction to the first actuator system 110.

The second SoC 200 includes a clock regenerator 233, a second timer 234, a PLL 235, a CPU 236, a disk controller 237, and a data receiver 238.

The data receiver 238 receives the data packets including the reference clock transmitted from the first SoC 100, and gives the data packets to the clock regenerator 233.

The clock regenerator 233 regenerates, from the data packets received by the data receiver 238, the clock signal generated by the clock generator 133. The clock regenerator 233 gives the regenerated clock signal to the second timer 234. In this manner, the first SoC 100 and the second SoC 200 are synchronized by using the reference signal of operation in common.

The second timer 234 receives the clock signal regenerated by the clock regenerator 233 and counts a timer value every time the reference clock is detected.

In order to manage the issued commands and time stamps, the PLL 235 generates a signal with a stable frequency. This signal is given to the CPU 236.

The CPU 236 operates in accordance with a firmware program. The firmware program is stored in a predetermined non-volatile storage region. The predetermined non-volatile storage region may be the magnetic disk 300 or ROM (not illustrated).

While communicating with the data receiver 238, the disk controller 237 adjusts an operation timing with the first SoC 100 and issues an instruction to the second actuator system 210.

Figure 4:
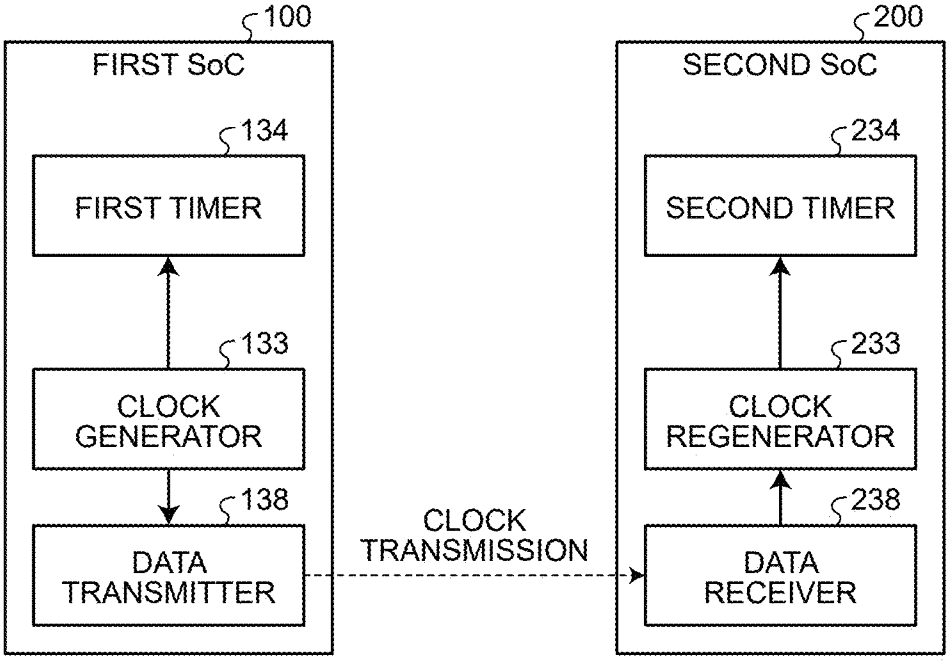
FIG. 4 is a diagram illustrating a schematic example of a block diagram of the SoCs according to the present embodiment.

Hereinafter, how to achieve synchronization between SoCs according to the present embodiment will be described. FIG. 4 is a diagram illustrating a schematic example of a block diagram of the SoCs according to the present embodiment. First, the clock generator 133 of the first SoC 100 generates a clock signal for a timer, to which a reference clock is added, and gives the generated clock signal to the first timer 134 and the data transmitter 138.

The first timer 134 detects a reference clock included in the received clock signal and counts a timer value.

The data transmitter 138 transmits the clock signal in the form of data packets to the data receiver 238 of the second SoC 200.

The data receiver 238 gives packet data to the clock regenerator 233. The clock regenerator 233 regenerates the clock signal from the packet data and gives the regenerated clock signal to the second timer 234.

The second timer 234 detects the reference clock included in the received clock signal and counts a timer value.

As described above, the first timer 134 and the second timer 234 count the timer values each time the reference timer is detected, thereby achieving synchronization between the first SoC 100 and the second SoC 200.

For the sake of convenience of synchronization between the first/second SoCs 100 and 200 according to the present embodiment, FIG. 4 illustrates the split actuator in which a single first SoC 100 and a single second SoC 200 are provided. However, it is allowable to use a split actuator provided with two or more second SoCs 200. In this case, the two or more second SoCs 200 each receive the clock signal generated by the first SoC 100, achieving time synchronization among three or more SoCs.

Figure 5:
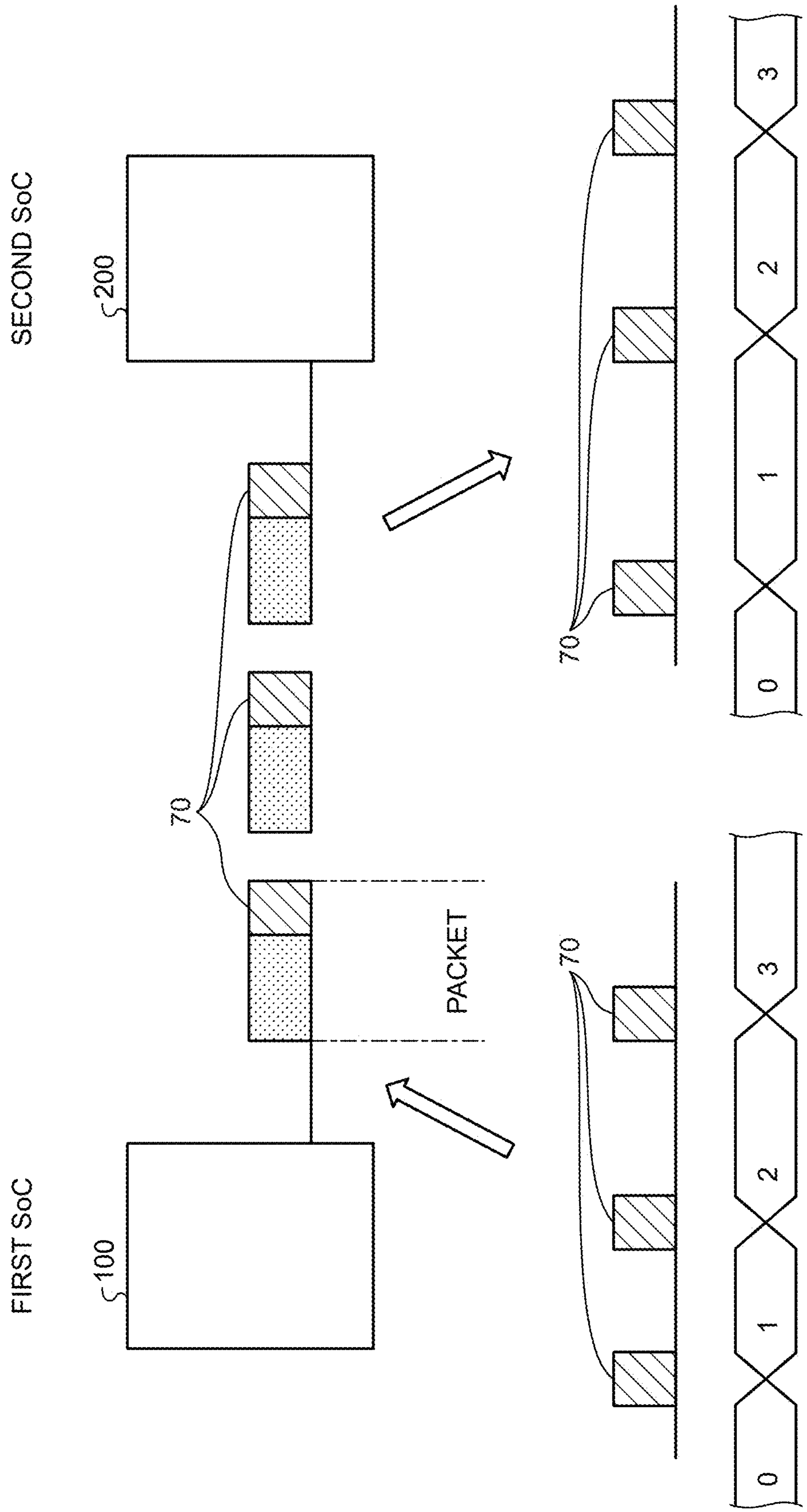
FIG. 5 is a diagram illustrating an example of a method of time synchronization between SoCs according to the present embodiment.

FIG. 5 is a diagram illustrating an example of a method of time synchronization between SoCs according to the present embodiment. The clock generator 133 of the first SoC 100 generates a clock signal for a timer, to which a reference clock 70 is added. Upon receiving the clock signal, the first timer 134 detects the reference clock 70 and counts the timer value each time the reference clock is detected.

The clock signal generated by the clock generator 133 is given also to the data transmitter 138. The data transmitter 138 receives the clock signal and transmits the received clock signal in the form of data packets to the data receiver 238 of the second SoC 200. The data packets, to which clock information has been added, are transmitted via a data communication path for data communication between the first SoC 100 and the second SoC 200. Pieces of the clock information are enclosed in the data packets at constant intervals.

The clock signal is used for operating a timer to grasp the time series of commands in the operation of the split actuator, and thus does not need to be a clock for a high-speed operation. The clock signal is implemented by transmitting the reference signal at a sufficiently slow constant time interval not hindering data communication.

The constant time period may be in the range about 0.1 μs to 10 μs, for example. However, the constant time period is not limited to this example. It is sufficient to be in a range not hindering data communication between the first SoC 100 and the second SoC 200 when transmitting the reference signal.

The data receiver 238 receives the data packets to which the reference clock 70 has been added, and gives the data packets to clock regenerator 233.

The clock regenerator 233 regenerates the received clock signal and gives the regenerated clock signal to the second timer 234. The second timer 234 detects the reference clock 70 and counts a timer value.

Figure 6:
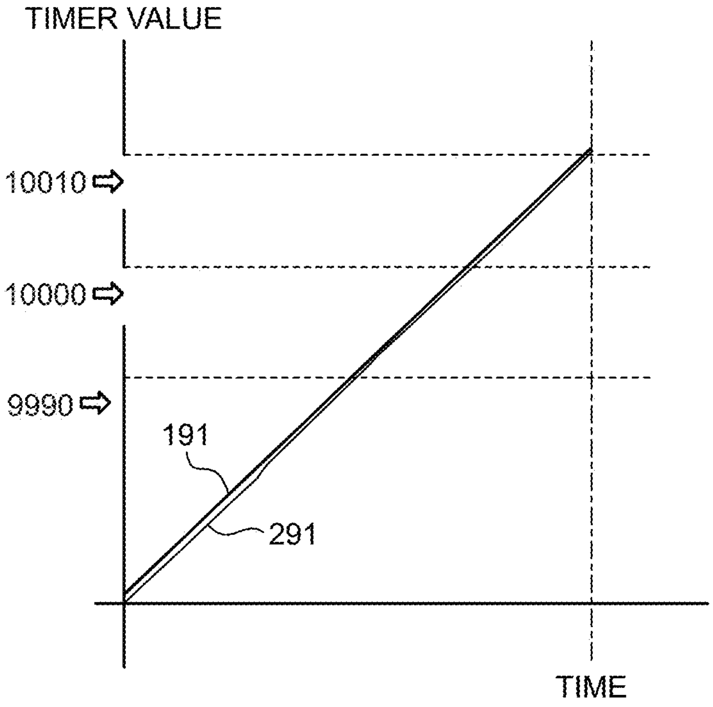
FIG. 6 is a diagram illustrating an example of a relationship between time and a timer value according to the present embodiment.

FIG. 6 is a diagram illustrating an example of a relationship between time and a timer value according to the present embodiment. In FIG. 6, a timer value 191 corresponds to the time measured by the first SoC 100, and a timer value 291 corresponds to the time measured by the second SoC 200.

The horizontal axis represents time, and the vertical axis represents timer values counted by the first timer 134 and the second timer 234.

As described with reference to FIG. 5, the data transmitter 138 transmits the reference signal of operation generated by the clock generator 133 of the first SoC 100 to the second SoC 200 being a dependent system. The reference signal is counted in each of the SoCs 100 and 200 and used as a common timer. With this configuration, as illustrated in FIG. 6, the timer value 191 of the first SoC 100 and the timer value 291 of the second SoC 200 do not deviate from each other with the lapse of time.

The purpose of this timer is to mutually grasp a time relationship of command processing. There is no need to have a specific circuit for correcting a timer value each SoC even after the timer operation is started as well as a deviation (offset) of timer values at the start timing of the timers between the first SoC 100 being a reference of the clock signal and the second SoC 200 being a dependent system.

Figure 7:
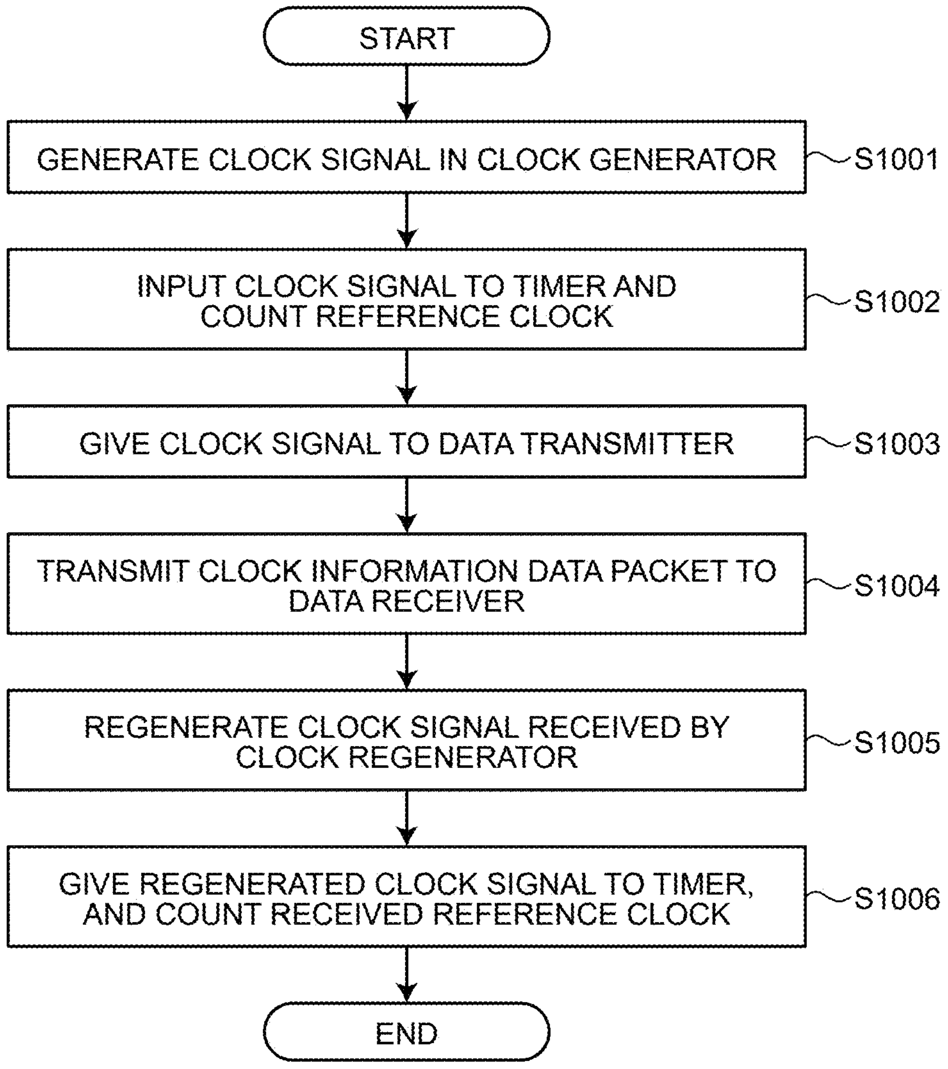
FIG. 7 is a flowchart illustrating an example of a method of time synchronization between SoCs in a split actuator according to the present embodiment.

Hereinafter, processing details of the present embodiment will be described. FIG. 7 is a flowchart illustrating an example of a method of time synchronization between SoCs in the split actuator according to the present embodiment.

First, the clock generator 133 of the first SoC 100 generates a clock signal for a timer, to which the reference clock 70 is added (S1001).

The first timer 134 receives the clock signal from the clock generator 133 and counts a timer value by detecting the reference clock 70 (S1002). The clock generator 133 gives the generated clock signal also to the data transmitter 138 (S1003).

The data transmitter 138 receives the clock signal from the clock generator 133 and encloses pieces of the clock information in data packets at constant intervals. The data transmitter 138 transmits the data packets to the data receiver 238 of the second SoC 200 via the data communication path (S1004).

The data receiver 238 receives the data packets via the data communication path and gives the received data packets to the clock regenerator 233. The clock regenerator 233 regenerates the clock signal from the data packets (S1005). The regenerated clock signal is given to the second timer 234.

The second timer 234 counts a timer value by detecting the reference clock 70 based on the received clock signal (S1006).

Figure 8:
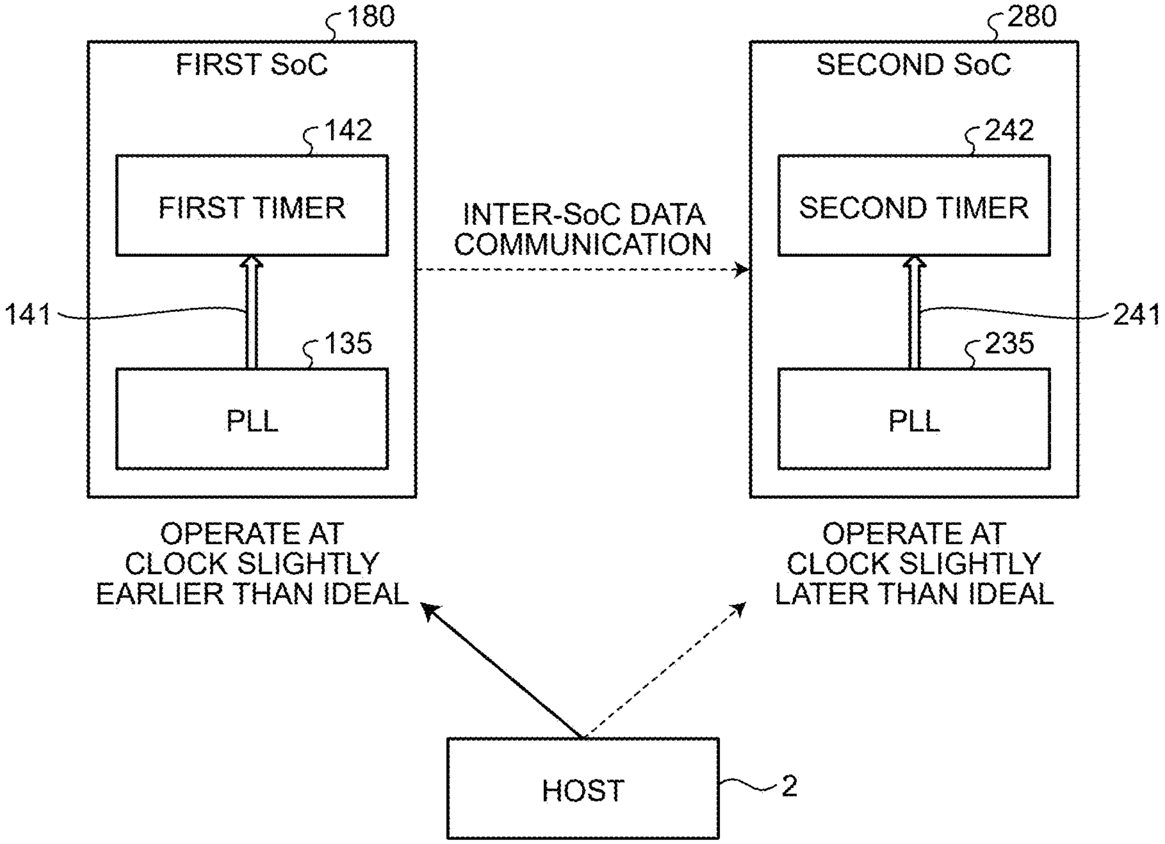
FIG. 8 is a diagram illustrating an example of a method of managing commands and time stamps in a conventional split actuator according to a comparative example.

Hereinafter, as a comparative example, a method of managing issued commands and time stamps in a conventional split actuator will be described. FIG. 8 is a diagram illustrating an example of a method of managing issued commands and time stamps in the conventional split actuator according to the comparative example.

In FIG. 8 of the comparative example, a command is issued from the host 2 in a magnetic disk device including the split actuator with the first SoC 180 and the second SoC 280 which are connected to the host 2.

The first SoC 180 is an SoC serving as an operation reference, and the second SoC 280 is an SoC to be dependent on and synchronized with the first SoC 180. The host 2 issues a command to each SoC. Processing contents are informed to the second SoC 280 from the first SoC 180 by data communication.

The comparative example uses the first timer 142 and the second timer 242 operating in SoC-dedicated PLLs 135 and 235, respectively. The PLLs 135 and 235 transmit clock signals of the same frequency. The clock signals 141 and 241 are output from the PLLs 135 and 235, respectively, and the first timer 142 and the second timer 242 receive clock signals and count timer values.

The PLLs 135 and 235 installed in each SoC manage a time stamp of the corresponding SoC. Due to an individual difference and a temperature condition of each SoC, there is a case that an operation error unique to the chips of the clocks that start the first timer 142 and the second timer 242 occurs, and thereby time synchronization between the first SoC 180 and the second SoC 280 fails.

Figure 9:
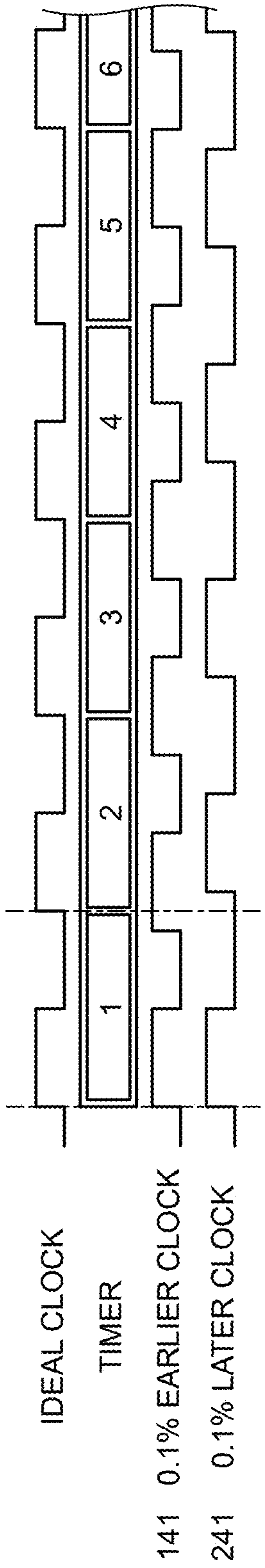
FIG. 9 is a diagram illustrating an example of a clock signal that may occur in the comparative example.

FIG. 9 is a diagram illustrating an example of a clock signal that may occur in the comparative example. As illustrated in FIG. 9, in the comparative example, when the timer detects a rise of an ideal clock, the timer counts. When detecting that the ideal clock falls after rising and the clock rises again, the timer counts again. With this operation, the timer counts every time of detecting the rise of the clock.

A frequency shift (jitter) of the clock signal generated by the SoC-dedicated circuits may slightly appear between the clock signal 141 used in the first SoC 180 and the clock signal 241 used in the second SoC 280.

FIG. 9 illustrates a clock signal generated by the frequency shift as described above. In a case where, as illustrated in FIG. 9, the clock signal 141 used in the first SoC 180 is 0.1% earlier than the ideal clock, the clock signal rises at timing earlier than the ideal clock.

In a case where the clock signal 241 used in the second SoC 280 is 0.1% later than the ideal clock, the clock signal rises at timing later than the ideal clock as illustrated.

Therefore, the first timer 142 detects and counts the rise of the clock at timing 0.1% earlier than the ideal clock. The second timer 242 detects and counts the rise of the clock at timing 0.1% later than the ideal clock.

If such a state continues for a long time, deviation between the count values of the first timer 142 and the second timer 242 occurs. Moreover, the environments such as the temperature conditions of the first SoC 180 and the second SoC 280 are not always the same. Therefore, the clocks of the first SoC 180 and the second SoC 280 are not always 0.1% faster and slower than the ideal clock.

Figure 10:
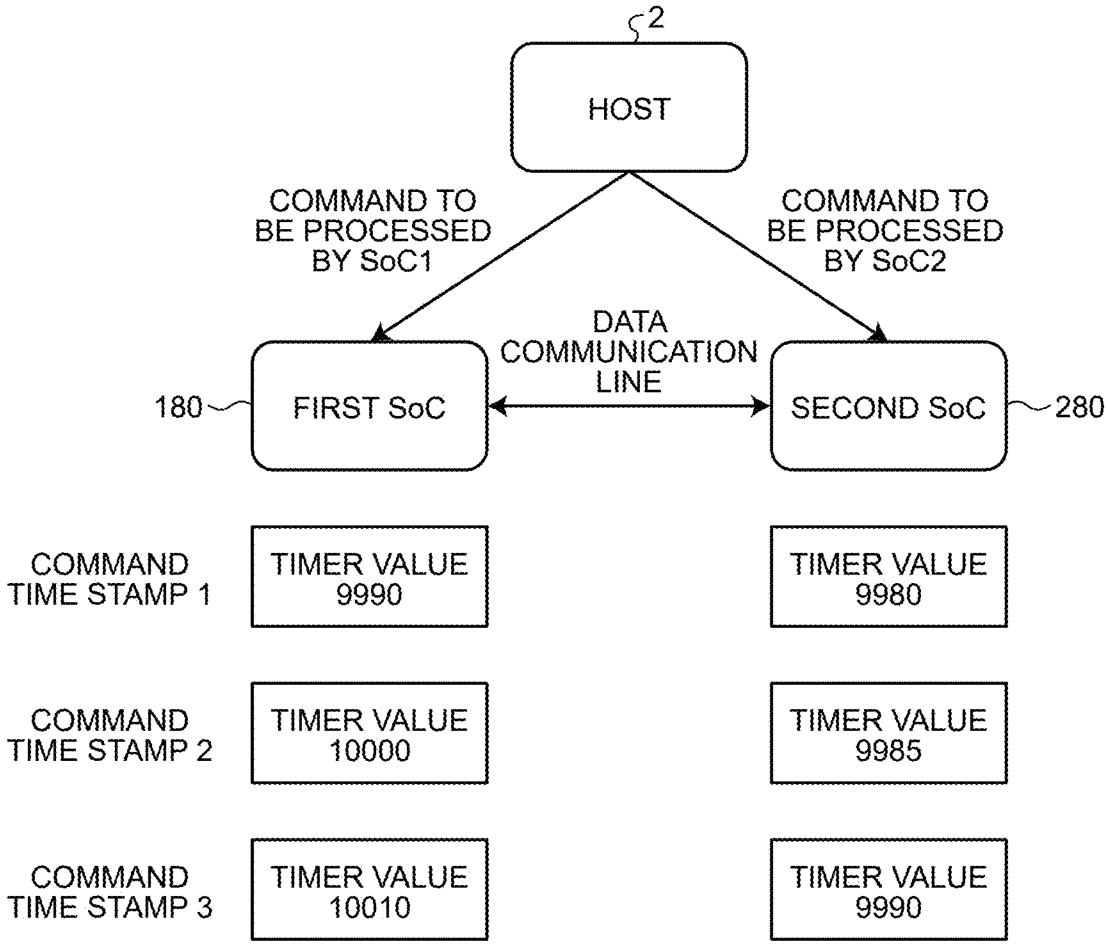
FIG. 10 is a diagram illustrating an example of a timer value of a time stamp that may occur in the comparative example.

FIG. 10 is a diagram illustrating an example of a timer value of a time stamp that may occur in the comparative example. In FIG. 10, commands are issued from the host 2 to the first SoC 180 and the second SoC 280, and the first SoC 180 and the second SoC 280 each perform data communication via a data communication line.

When the commands are issued from the host 2 to the first SoC 180 and the second SoC 280, the timer values in SoCs may greatly deviate due to deviation of a clock generated by a circuit unique to each SoC, as described above with reference to FIGS. 8 and 9.

In FIG. 10, timer values of the first SoC 180 and timer values of the second SoC 280 correspond to the time stamp 1 to 3 at three time points. The error of the timer value between the first SoC 180 and the second SoC 280 becomes "10" in the command time stamp 1, becomes "15" in the command time stamp 2, and becomes "20" in the command time stamp 3. Thus, the deviation of the timer values between the first SoC 180 and the second SoC 280 increases with the lapse of time. This may cause a problem that, in a case where the processing times of the commands sent from the host to the first SoC 180 and the second SoC 280 are compared using these time stamps, the order in which the commands are processed appears to be switched.

Figure 11:
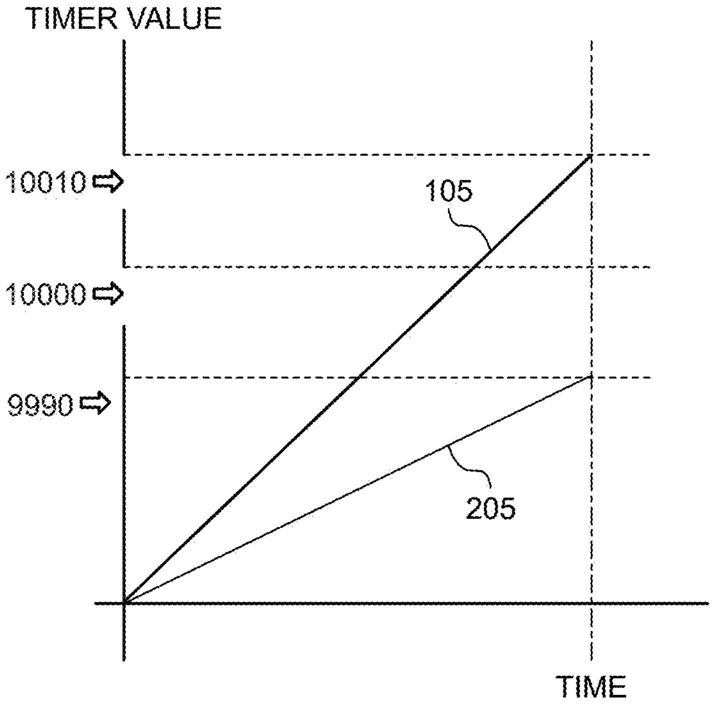
FIG. 11 is a diagram illustrating an example of a relationship between time and a timer value of each SoC in the conventional split actuator according to the comparative example.

FIG. 11 is a diagram illustrating an example of a relationship between time and a timer value of each SoC in the conventional split actuator according to the comparative example. FIG. 11 illustrates a timer value 105 for the time measured by the first SoC 180 and a timer value 205 for the time measured by the second SoC 280. The horizontal axis represents time, and the vertical axis represents timer values counted by the first timer 142 and the second timer 242.

As illustrated in FIG. 11, it can be seen that the difference (or deviation) between the timer values of the two SoCs increases with the lapse of time. Moreover, as described above, the environments such as the temperature conditions of the first SoC 180 and the second SoC 280 are not always the same. Therefore, the clocks of the first SoC 180 and the second SoC 280 are not always 0.1% faster or slower than the ideal clock. This makes it difficult to correct the count values of the first timer 142 and the second timer 242.

The above-described comparative example may cause a problem due to a difference in the timer values, such as in a case that one SoC determines timeout but another SoC continues operation due to use of timer values different from those in the former one SoC.

Therefore, in a method like the above-described comparative example, the timers operate at the same frequency, but due to a subtle frequency shift (jitter) of the clock generated by each SoC-dedicated circuit, the timer values indicated by the individual SoCs deviate in a long time.

In contrast, the magnetic disk device 1 according to the present embodiment transmits the reference signal of the operation from the first SoC 100 in the split actuator to the dependent second SoC 200, and regenerates the clock signal received by the second SoC 200 to achieve time synchronization between the SoCs. With this configuration, by using information of the same clock, the first SoC 100 and the second SoC 200 can avoid time inconsistency between the first SoC 100 and the second SoC 200, leading to achievement of correct synchronization between the SoCs.

Moreover, in the magnetic disk device 1 according to the present embodiment, the first SoC 100 counts, by the first timer 134, every time a signal to be an operation reference is detected, and performs synchronization with the second SoC 200 based on a value counted by the first timer 134. This can solve the problem of the deviation of the timer value between the SoCs due to the chip-specific clock operation error caused by the timer operating in the SoC-dedicated PLLs 135 and 235 in the comparative example, making it possible to avoid the deviation of the timer values between the SoCs. Additionally, in the timer values counted by the first SoC 100 and the second SoC 200, there is no need to use a specific circuit for correcting timer values in each SoC at the start of operation of the timer and after the start of operation of the timer. This makes it possible to achieve correct synchronization between the SoCs.

Moreover, in the magnetic disk device 1 according to the present embodiment, the second SoC 200 receives a reference signal of operation from the first SoC 100, and counts, by the second timer 238, every time the reference signal is detected. The second SoC 200 then performs synchronization with the first SoC 100 based on a value counted by the second timer 234. This can solve the problem of the deviation of the timer value between the SoCs due to the chip-specific clock operation error caused by the timer operating in the SoC-dedicated PLLs 135 and 235 in the comparative example, making it possible to avoid the deviation of the timer values between the SoCs. Additionally, for the timer values counted by the first SoC 100 and the second SoC 200, there is no need to use a specific circuit for correcting timer values in each SoC at the start of operation of the timer and after the start of operation of the timer. This makes it possible to achieve correct synchronization between the SoCs.

In the magnetic disk device 1 according to the present embodiment, when the data transmitter 138 of the first SoC 100 transmits a reference signal of operation to the second SoC 200, the reference signal is transmitted via a data communication path for data communication between the first SoC 100 and the second SoC 200. With this configuration according to the present embodiment, there is no need to newly provide an interface for communicating clock information with the second SoC 200, leading to achievement of correct synchronization between the SoCs without new equipment.

In the magnetic disk device 1 according to the present embodiment, when the data transmitter 138 of the first SoC 100 transmits a reference signal of operation to the second SoC 200, the reference signal is transmitted at a constant time interval not hindering the data communication between the first SoC 100 and the second SoC 200. With this configuration according to the present embodiment, it is possible to achieve synchronization between the SoCs while performing data communication between the SoCs.

In the present embodiment, the first SoC 100 and the second SoC 200 are described as an example of the first controller chip and the second controller chip that control the split actuator provided in the magnetic disk device, but the controller chips are not limited thereto. For example, the present embodiment can be applied to controller chips other than the first SoC 100 and the second SoC 200 in the split actuator as long as the controller chips can control the magnetic head 300, the first actuator system 110, and the second actuator system 210.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

one or more magnetic disks on each of which tracks are provided, each of the tracks including data sectors;

one or more first magnetic heads and one or more second magnetic heads, each configured to write data and read data to and from data sectors of the one or more magnetic disks;

a first actuator system configured to move the one or more first magnetic heads;

a second actuator system configured to move the one or more second magnetic heads;

a first controller chip configured to control the one or more first magnetic heads and the first actuator system; and a second controller chip configured to control the one or more second magnetic heads and the second actuator system, wherein the first controller chip configured to generate a reference signal of operation, the reference signal being detected and counted by the first controller chip and the second controller chip, and transmit the reference signal to the second controller chip, and the second controller chip configured to receive the reference signal, regenerate the reference signal, and perform synchronization with the first controller chip based on the reference signal regenerated.

2. The magnetic disk device according to claim 1, wherein the first controller chip includes a first timer configured to count each time the reference signal is detected, and the first controller chip is configured to perform the synchronization with the second controller chip based on a value counted on the first timer.

3. The magnetic disk device according to claim 2, wherein the second controller chip includes a second timer configured to count each time the reference signal is detected, and the second controller chip is configured to perform the synchronization with the first controller chip based on a value counted on the second timer.

4. The magnetic disk device according to claim 3, wherein the first controller chip is configured to transmit the reference signal via a data communication path for data communication between the first controller chip and the second controller chip.

5. The magnetic disk device according to claim 4, wherein the first controller chip is configured to perform the transmission of the reference signal at constant time intervals not hindering data communication between the first controller chip and the second controller chip.

6. The magnetic disk device according to claim 1, wherein the second controller chip is constituted by two or more controller chips, and each of the two or more controller chips is configured to perform synchronization with the first controller chip by receiving the reference signal from the first controller chip.

7. A signal synchronization method implemented by a magnetic disk device, the magnetic disk device including: one or more magnetic disks on each of which tracks are provided, each of the tracks including data sectors; one or more first magnetic heads and one or more second magnetic heads, each configured to write data and read data to and from data sectors of the one or more magnetic disks; a first actuator system configured to move the one or more first magnetic heads; a second actuator system configured to move the one or more second magnetic heads; a first controller chip configured to control the one or more first magnetic heads and the first actuator system; and a second controller chip configured to control the one or more second magnetic heads and the second actuator system, the signal synchronization method comprising:

generating, by the first controller chip, a reference signal of operation, the reference signal being detected and counted by the first controller chip and the second controller chip;

transmitting, by the first controller chip, the reference signal to the second controller chip;

receiving, by the second controller chip, the reference signal;

regenerating, by the second controller chip, the reference signal; and performing, by the second controller chip, synchronization with the first controller chip based on the reference signal regenerated.

8. The signal synchronization method according to claim 7, further comprising:

counting, by the first controller chip, each time the reference signal is detected; and performing, by the first controller chip, the synchronization with the second controller chip based on a value counted by the first controller chip.

9. The signal synchronization method according to claim 8, further comprising:

counting, by the second controller chip, each time the reference signal is detected; and performing, by the second controller chip, the synchronization with the first controller chip based on a value counted by the second controller chip.

10. The signal synchronization method according to claim 9, wherein the transmitting of the reference signal to the second controller chip is performed via a data communication path for data communication between the first controller chip and the second controller chip.

11. The signal synchronization method according to claim 10, wherein the transmitting of the reference signal to the second controller chip is performed at constant time intervals not hindering data communication between the first controller chip and the second controller chip.

12. The signal synchronization method according to claim 7, wherein the second controller chip is constituted by two or more controller chips, and the method further comprises performing, by each of the two or more controller chips, synchronization with the first controller chip by receiving the reference signal from the first controller chip.

* * * * *